Jan. 2, 1940. T. STEPHEN ET AL 2,185,610
METHOD OF AND APPARATUS FOR MAKING A MOTION PICTURE RECORD
Filed Feb. 8, 1936 6 Sheets-Sheet 1
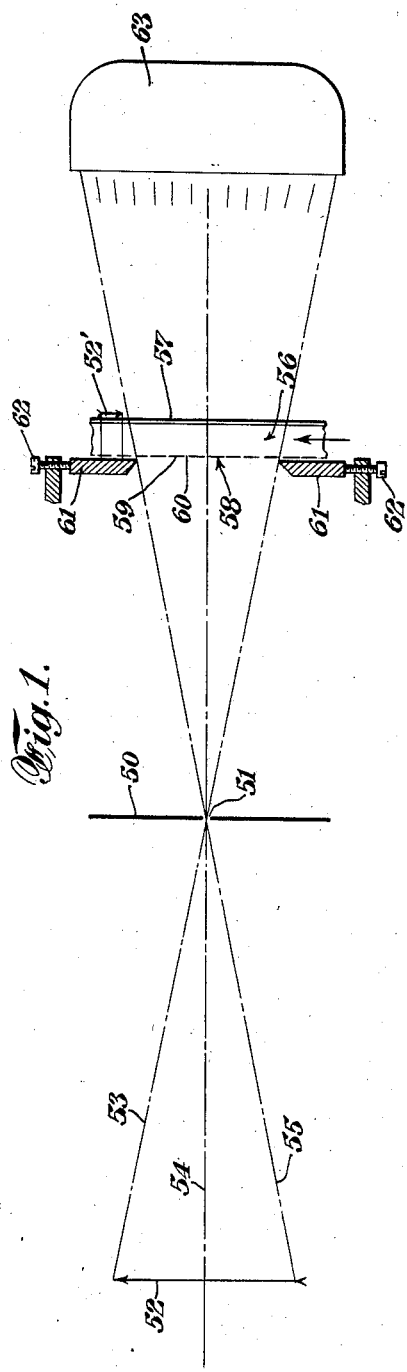
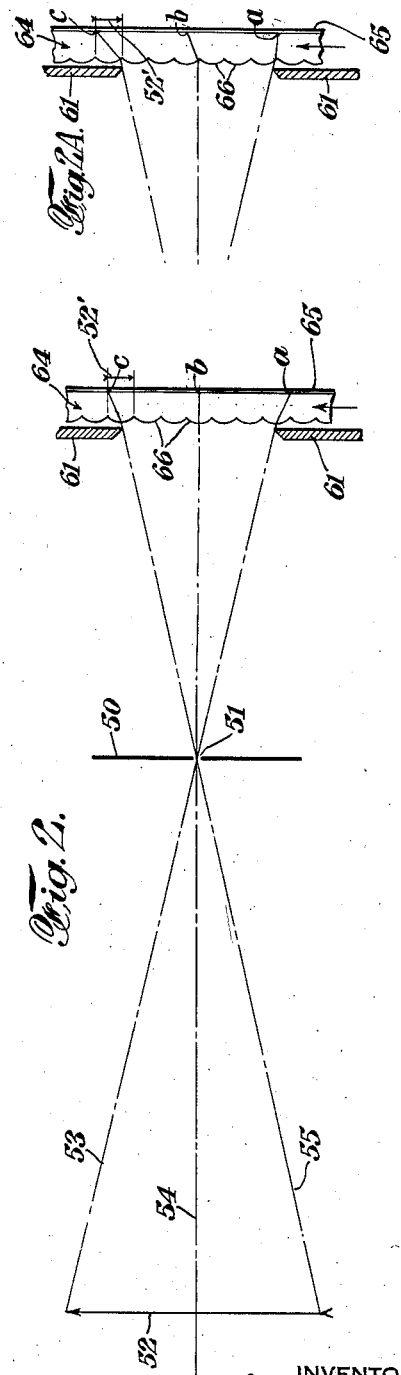
INVENTOR
Thomas Stephen
Richard K Parsell
BY
Kenyon & Kenyon
ATTORNEYS Jan. 2, 1940.  T. STEPHEN ET AL  2,185,610
METHOD OF AND APPARATUS FOR MAKING A MOTION PICTURE RECORD
Filed Feb. 8, 1936  6 Sheets-Sheet 2
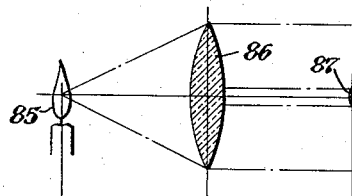
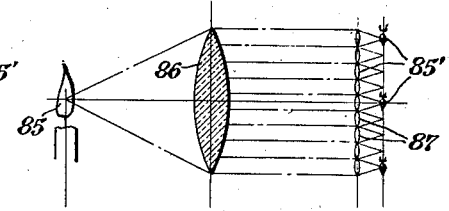
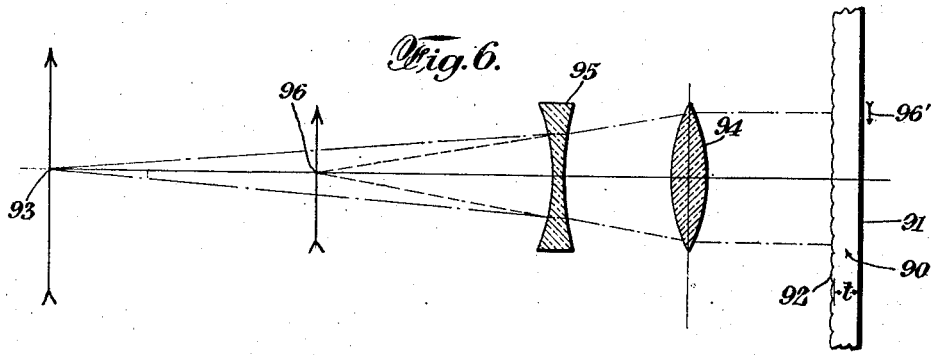
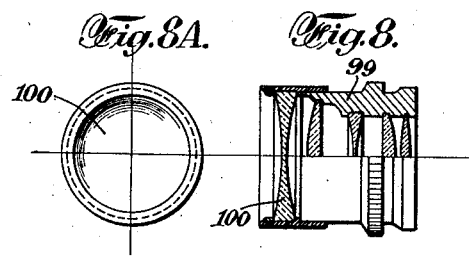
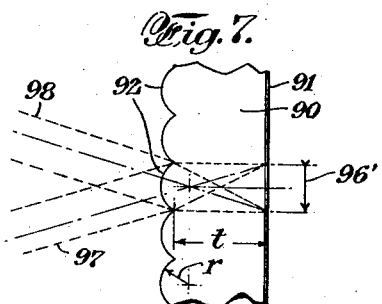
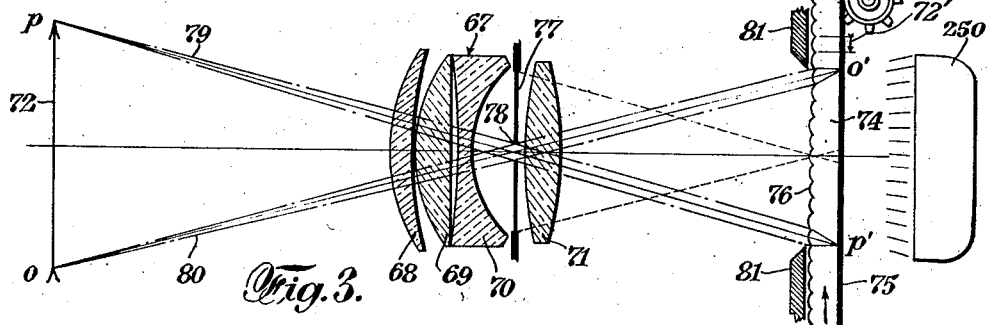

Jan. 2, 1940.  T. STEPHEN ET AL  2,185,610
METHOD OF AND APPARATUS FOR MAKING A MOTION PICTURE RECORD
Filed Feb. 8, 1936  6 Sheets-Sheet 3

INVENTORS
Thomas Stephen
Richard T. Parsell
BY Kenyon & Kenyon
ATTORNEYS

Jan. 2, 1940.  T. STEPHEN ET AL  2,185,610
METHOD OF AND APPARATUS FOR MAKING A MOTION PICTURE RECORD
Filed Feb. 8, 1936  6 Sheets-Sheet 4
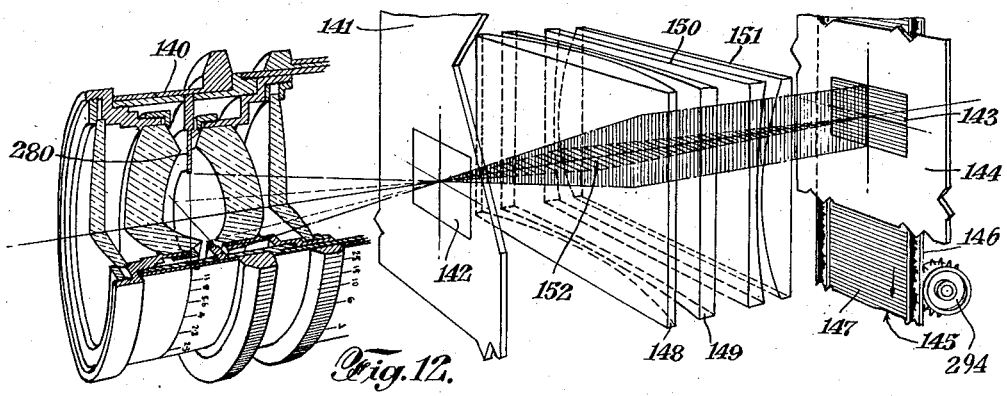
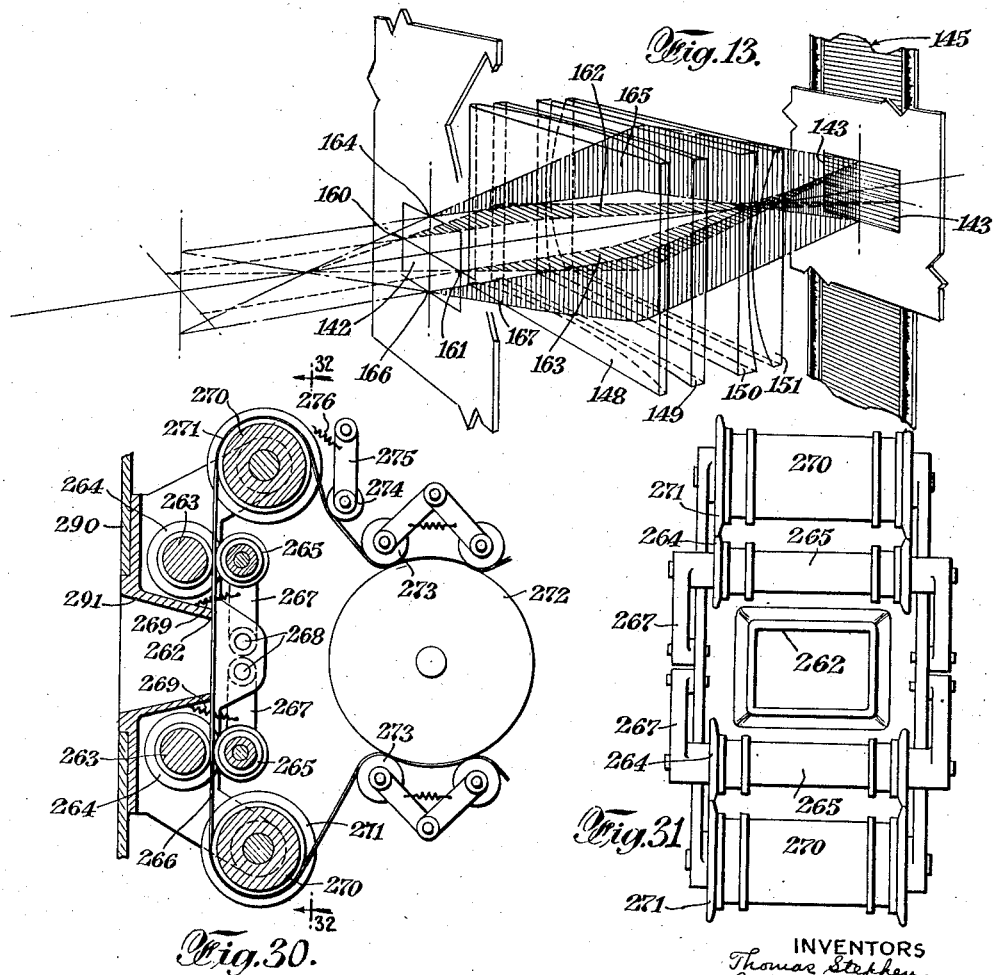
INVENTORS
Thomas Stephen
Richard A. Pursell
BY Kenyon & Kenyon
ATTORNEYS

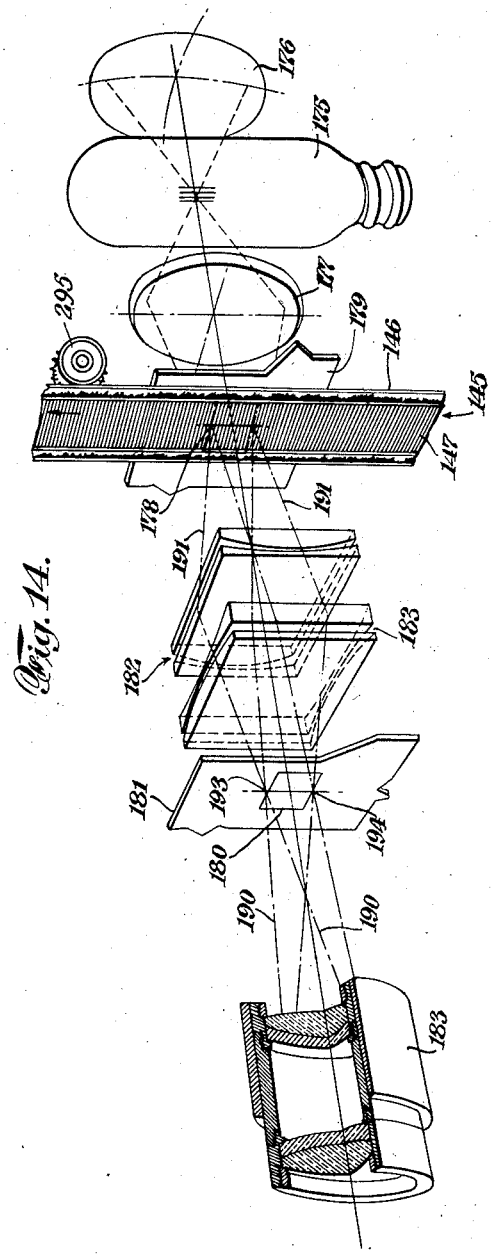
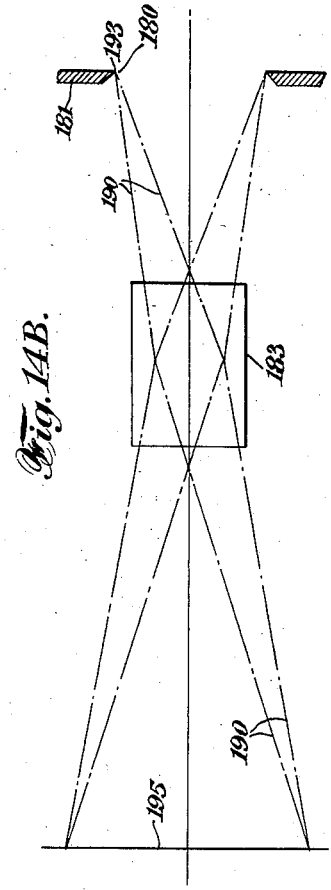
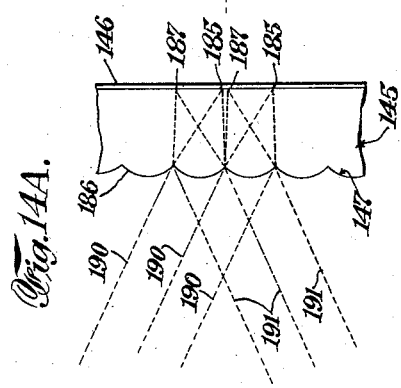

Jan. 2, 1940. T. STEPHEN ET AL 2,185,610
METHOD OF AND APPARATUS FOR MAKING A MOTION PICTURE RECORD
Filed Feb. 8, 1936 6 Sheets-Sheet 6
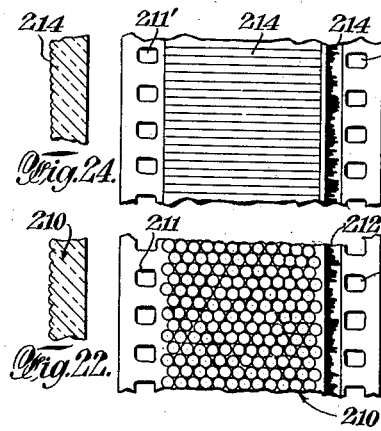
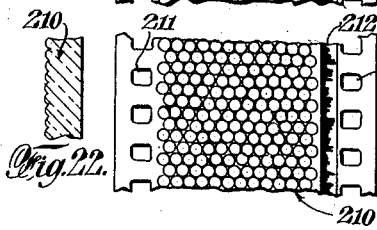
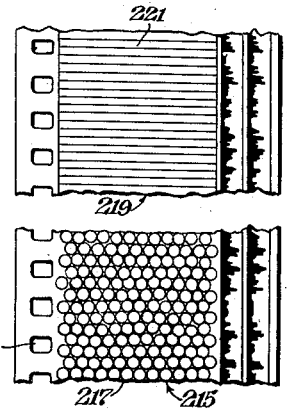
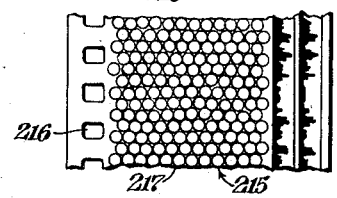
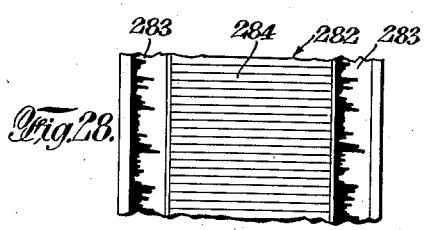
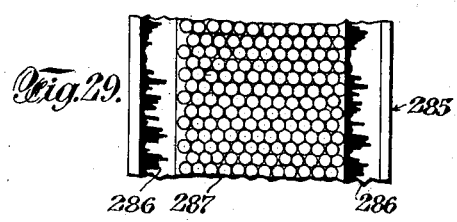
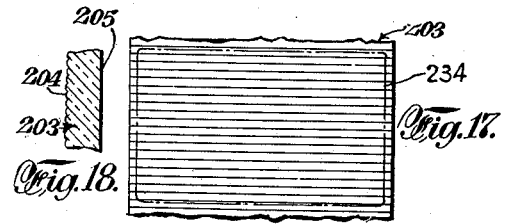
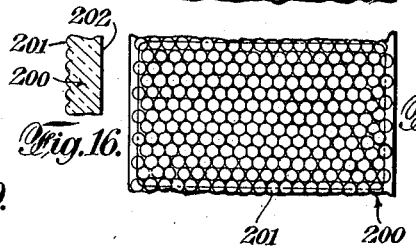
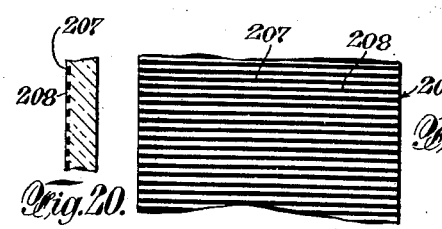
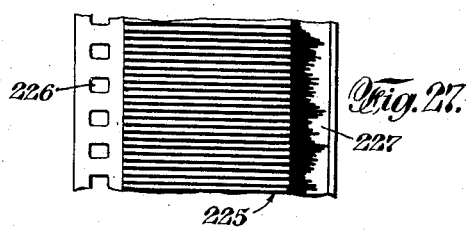
INVENTORS
Thomas Stephen
Richard K Parsell
BY
Kenyon & Kenyon
ATTORNEYS Patented Jan. 2, 1940

2,185,610

UNITED STATES PATENT OFFICE 2,185,610

METHOD OF AND APPARATUS FOR MAKING A MOTION PICTURE RECORD

Thomas Stephen, New York, and Richard K. Parsell, Brooklyn, N. Y.; said Parsell assignor to said Stephen Application February 8, 1936, Serial No. 62,900

9 Claims. (Cl. 88—16.8)

This invention relates to a new type of motion picture record and to method of and apparatus for photographing and projecting the same.

It is an object of this invention to afford a method and apparatus whereby, according to a new principle of recording the positions of bodies in motion on a record such as a film, motion pictures can be photographed and projected merely by moving the film or similar recording means past a suitable optical structure, the motion of the film being continuous (non-intermittent) and the necessity for moving parts other than those necessary to actuate the film continuously being eliminated.

Advantages of this invention are numerous. It has long been apparent that intermittent film motion in connection with cameras and projectors for motion pictures has necessitated the use of complicated and delicate machinery including synchronized shutter and sprocket drives, claw action mechanisms, locking devices, take-up mechanisms, registering devices and the like which make the machinery elaborate and costly and so delicate as to require frequent adjustments and repairs. Moreover, such mechanisms impose severe limitations on cinematography especially with reference to the intensity of light used and the speed at which the film can travel. With the ordinary intermittent camera less than 50% of the illumination of the subject received by the objective lens effectively reaches the photographic emulsion on the film and about 24 pictures per second is usually regarded as the maximum speed of film. According to the present invention, such difficulties and limitations have been overcome.

Other advantages of this invention reside in elimination of stroboscopic illusions, elimination of flicker, elimination of the necessity for perforations on motion picture film, elimination of the necessity for elaborate silencing devices in the motion picture cameras and equipment when sound pictures are being recorded, and reduction in the wear and tear on motion picture films.

Attempts have heretofore been made to eliminate intermittent motion of the film by means of rotary mirror arrangements and the like but such devices have been of an even more complicated, delicate and expensive character than the ordinary type of equipment and have not gone into practical use.

The present invention constitutes a complete departure from the old idea, that has persisted since the first conception of motion pictures, of making motion pictures by making a series of independent ordinary photographs and later projecting the pictures at a rate such that persistence of vision blends the pictures so as to achieve the semblance of continuous motion.

A feature of this invention resides in the movement of a recording screen such as a photographic emulsion relatively to an optical structure, such as an objective lens or a projecting lens, together with a scanning screen which scans the light rays passing through the optical structure. Thus in photographing a subject in motion, light from the subject is received by a suitable optical objective and is directed by it to a motion picture film, for example, bearing a photographic emulsion. Interposed between the objective and the emulsion is a scanning screen containing a plurality of scanning elements. When the film is moved together with the scanning screen the light falling on the emulsion is scanned so that condensed recorded images of the subject produced by the scanning action of the scanning screen are formed on the emulsion. In the normal case the scanning screen is part of the motion picture film and is on the surface thereof toward the objective, the photographic emulsion being on the opposite surface of the film. In such case it is apparent that the only apparatus that is required is a suitable objective and means for moving the special film relatively thereto and behind a suitable film gate. Since the subject is being successively and independently scanned during the movement of the scanning elements and emulsion relatively to objective, it is apparent that any motion of the subject is recorded on the motion picture film.

When the film has been developed and printed, motion pictures can be projected merely by placing a strong source of light behind the film and directing the light through the emulsion and scanning elements and through an optical projecting structure onto a viewing screen of usual type such as a reflecting or translucent screen. When the emulsion and scanning elements are moved relatively to the projecting optical structure, the rays pass through the scanning screen and projecting structure, so as to build up an image on the viewing screen and any motion of the original subject will be reproduced on the viewing screen.

Features of this invention relate to the method used, to the character of the apparatus and to the record that is produced according to this invention.

According to this invention, light from a subject being photographed is scanned so that light from separate points in front of the objective fall at separate points on the record screen (e. g. photographic emulsion) during the motion of the screen and in projection light from such separate points on the record screen are projected during the motion of the record onto a viewing screen so as to fall at separate stationary points. This can be done in several ways. Some such ways will be described below for the purpose of illustrating this invention.

Before discussing specific illustrations of this invention, it may be said that in certain of the modifications described below the scanning elements used are adapted to resolve light falling on a recording screen (such as a photograph emulsion) into a plurality of separate points or minute areas depending upon the angle of incidence of the light rays upon the scanning elements; and that the optical structure that is used is adapted to direct light rays onto the scanning screen so that light rays from points of the subject being photographed which are disposed in a direction corresponding to the direction of motion of the recording screen can fall on the recording screen from one direction only with reference to the direction of motion of the recording screen, the direction of rays from each of such points with reference to the direction of motion of the recording screen being different from the direction of rays from the other points. The scanning elements then cause the light from such separate points to strike the recording screen at separate points regardless of the fact that the recording screen may be moved continuously relatively to the optical structure during the exposure.

When the record is completed, small views of the subject are produced on the record screen. When the record screen and scanning screen comprise a unitary article (e. g. a film), as is ordinarily the case, the resulting article is of an essentially unique construction. The scanning screen may take several forms as will be described more in detail below. Thus the scanning elements are preferably of a lenticular structure such as portions of spheres (spherical lenses) or portions of cylinders (cylindrical lenses or ridges) or may be in the form of alternate opaque and transparent bands (in the form of a grating). In any such case the resulting film or record has a plurality of scanning elements on one face thereof and behind each of the scanning elements a scanned view of the subject. The views may be in the form of negatives or positives as the case may be.

When the record (such as the new film record above described) is used in projection, the scanning elements cause light, which originally fell upon the film from special directions in making the photograph, to be projected in corresponding special directions and the projecting structure that is used projects the light emanating from the film in the special directions to be projected into the viewing screen so that light directed in any special direction with reference to the longitudinal extent of the film will fall at particular stationary points on the viewing screen. Thus regardless of the continuous movement of the film during projection an unblurred image is visible on the viewing screen and, due to the motion of the film, any movement of the subject originally photographed is reproduced on the viewing screen.

Further description of this invention, will be in connection with the accompanying drawings which show certain illustrative embodiments thereof and certain illustrations of how the invention may be practiced; and other objects, features, and advantages of this invention will be apparent from the following description. The figures shown in the drawings are as follows:

Fig. 1 is a side diagrammatic view of an elementary form of cinematographic apparatus embodying this invention and illustrating the practice thereof.

Fig. 2 is a side diagrammatic view of a modified form of apparatus generally similar to that shown in Fig. 1.

Fig. 2A is a side diagrammatic view of a portion of the apparatus shown in Fig. 2 with the film in a different position relative to the film gate.

Fig. 3 is a side diagrammatic view of cinematographic apparatus according to this invention using an objective lens structure and a transverse slit at the objective lens structure.

Fig. 4 is a side diagrammatic view which is explanatory of the action of lenses between which light rays from point sources travel in parallel lines.

Fig. 5 is a side diagrammatic view similar to Fig. 4 wherein a plurality of lens elements is used.

Fig. 6 is a side diagrammatic view similar to Figs. 4 and 5 but showing a lenticular film and a simple form of compensating lens.

Fig. 7 is a side diagrammatic view illustrating the paths of rays striking lens elements of the lenticular film.

Fig. 8 is a side view partly in section of an objective lens structure including a compensating lens.

Fig. 8A is a front view of the lens structure shown in Fig. 8.

Fig. 12 is a perspective view largely diagrammatic of photographic apparatus embodying this invention which uses cylindrical type compensating lens structures.

Fig. 13 is a perspective diagrammatic view showing the paths of certain rays through the optical structures shown in Fig. 12.

Fig. 14 is a perspective diagrammatic view of projecting apparatus having cylindrical type compensating lens structures.

Fig. 14A is a detailed diagrammatic side view of the film used in Fig. 14 which shows the paths of certain light rays in traveling through the film.

Fig. 14B is a diagrammatic side view of a portion of apparatus shown in Fig. 14 illustrating the paths of certain rays in traveling from the projecting lens structure to the viewing screen.

Fig. 15 is a plan view of a film which may be used according to this invention and which comprises spherical type lens elements.

Fig. 16 is a side sectional view of the film shown in Fig. 15.

Fig. 17 is a plan view of a film which may be used according to this invention and which comprises cylindrical lens ridges.

Fig. 18 is a side sectional view of the film shown in Fig. 17.

Fig. 19 is a plan view of another type of film which may be used in carrying out this invention and which includes a grating of one surface thereof.

Fig. 20 is a side sectional view of the film shown in Fig. 19.

Fig. 21 is a plan view of a modified type of film comprising spherical lens elements.

Fig. 22 is a side view of the film shown in Fig. 21.

Fig. 23 is a plan view of a modified form of film comprising cylindrical lens ridges.

Fig. 24 is a side view of the film shown in Fig. 23.

Fig. 25 is a plan view of a further modified form of film comprising spherical lens elements.

Fig. 26 is a plan view of a further modified form of film comprising cylindrical lens elements.

Fig. 27 is a plan view of a modified form of film comprising a grating.

Fig. 28 is a plan view of a still further modified form of film comprising cylindrical lens elements.

Fig. 29 is a plan view of a still further modified form of film comprising spherical lens elements.

Fig. 30 is a side view partly in section of apparatus which may be used in photographing or projecting motion pictures with a continuous motion of the film.

Fig. 31 is a view substantially in the line 32—32 of the apparatus shown in Fig. 30 with certain of the parts omitted.

Figure 9:
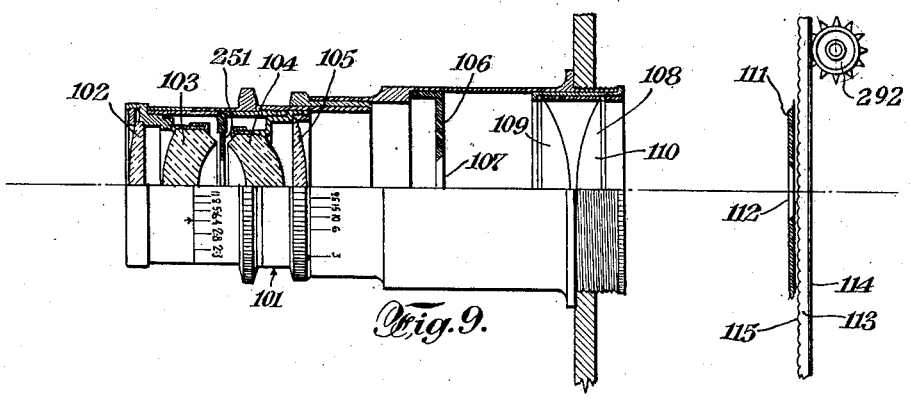
Fig. 9 is a side view partly in section and largely diagrammatic of apparatus for photographing motion pictures according to the present invention which apparatus employs a spherical type compensating lens.

In order that certain features of this invention may be the more readily understood, the scanning of a subject to be photographed will be described in connection with a very simple structure which is analogous in some respects to the so-called "pin-hole" camera.

In this connection, reference is made to Fig. 1, wherein the wall or other opaque barrier 50 (such as the front wall of a camera box) has a small hole or aperture 51 therein which may be very small as in a pin-hole camera. If a subject 52 to be photographed is placed in front of the hole 51, light rays from the subject such as rays 53, 54 and 55 will pass through the hole 51 each at a different angle with respect to the others. In this instance a pin hole is used as an objective optical structure. In other devices described below other types of objective optical structures are used.

According to this invention, a camera for taking motion pictures is afforded by using in connection with the pin-hole objective a composite film indicated generally by the reference character 56 which comprises the record screen 57 (such as a photographic emulsion) and a scanning screen which is indicated generally by the reference character 58 and which, in this modification, is in the form of a grating comprising opaque strips 59 extending crosswise on the film between which are transparent band elements 60 (e. g. as in Figs. 19 and 20). To afford a film gate of desired width, film gate members 61 are provided which may be mounted so as to adjust the spacing between them as by means of thumb screws 62.

Suitable means such, for example, as the device shown in Figs. 30 and 31 and described below although any other means may be used are provided for moving the composite film 56 past the film gate and transversely with respect to the light coming through the hole 51 from subject 52. If the composite film 56 is moved upwardly as shown by the arrow in Fig. 1, it is seen that as an opening or transparent band 60 of the scanning screen comes above the end of the lower gate member 61, light of ray 53 from the upper end of the subject 52 will pass through a transparent band 60 and fall on the record screen 57. It is also to be noted that as the composite film 56 is moved upwardly the point thereon which is exposed to the ray of light 53 is not again exposed to light from any source. This is illustrated by noting the paths of light rays 54 and 55. The light ray 54 from the mid portion of subject 52 passes through a transparent band 60 and falls at a point on the record screen 57 which is different from the point at which ray 53 fell with reference to the position of scanning elements in front thereof. Similarly, the ray 55 from the lower part of subject 52 strikes a still different point on the record screen 57 with reference to the position of the transparent portion of scanning elements in front thereof. By the time that the composite film 56 has moved past the uppermost gate member 61, it is seen that the subject 52 has been scanned by the film and that behind each of the elements of the scanning screen there will have been formed an inverted longitudinally condensed image 52' of the subject 52. It is desirable that each of the images 52' should fall within the space on the recording screen 57 which corresponds to the space on the scanning screen occupied by an element thereof (each element extending from the mid portion of one opaque band to the mid portion of the next opaque band). The extent of the image 52' longitudinally of the film can be controlled in various ways and brought to this desired relationship. As far as the camera operation is concerned, the spacing of the gate members 61 controls the angle at which marginal rays can pass through the transparent bands 60. In this manner, the length of the image 52' can be controlled but this limits the amount of subject 52 that can be recorded. The length of the image 52' can also be controlled by adjusting the spacing of the composite screen 56 from the aperture 51 and by controlling the thickness of the composite film 56 so as to effect the spacing of the scanning screen 58 from the recording screen 57. For preferred results the camera and film that is used are adapted so that the subject will be brought to a focus on the photographic emulsion and so that the subject when scanned in a direction corresponding to the direction of motion of the film will be recorded completely behind each of the elements of the scanning screen and will occupy an area in the recording screen which substantially corresponds to the area of the different scanning elements of the scanning screen as defined by the centers of the opaque strips in front thereof.

From the foregoing it is apparent that during the motion of the composite film 56 past the film gate formed by member 61, the subject 52 is successively scanned by and reproduced behind each element of the scanning screen at the face of the composite film. There is no blurring of the images formed on the record screen 57 inasmuch as light from any one point of the subject 52 can fall at only one point behind each of the scanning elements notwithstanding the continuous motion of the film past the film gate during the exposure thereof. If the subject 52 moves or comprises any part which moves, such movement will be recorded on the record screen 57 as the different positions of the subject 52 are recorded faithfully as successive images 52'. The speed at which the film is moved can correspond to that which is appropriate for usual motion pictures. Also the film can be made to move faster or slower. Thus for subjects which move very slowly the film can be moved very slowly and for subjects which move very rapidly the film can be moved very rapidly. Very great flexibility as to the rate of movement of the film is possible according to the practice of this invention.

The foregoing description chiefly concerns the making of a photographic record suitable for motion pictures. If the film is transparent, except for the opaque portions 59, projection of motion pictures can be accomplished merely by placing a source of illumination 63 behind the film. The light rays (traveling in the reverse direction of that described above) would then pass through the film including the scanning screen on the face thereof, through the aperture 51 and onto any suitable viewing screen of the reflecting or translucent type (not shown). Upon moving the film past the film gate continuously the appearance of motion of the projected pictures would be obtained.

In Fig. 2 this invention is again illustrated in connection with an elementary type of apparatus of the pin-hole camera type. In this figure the parts of the camera are similar to the parts shown in Fig. 1 and the camera is shown as photographing a subject 52 as in Fig. 1. Instead of using a composite film wherein the scanning screen consists of a grating, a scanning screen is used consisting of a plurality of substantially similar lenses. The lenses may be of the spherical or of the cylindrical type which are shown more in detail in Figs. 15, 16, 17 and 18, for example. By the use of a scanning screen made up of lenses it is possible to transmit more light to the photographic emulsion. The composite film indicated generally by 64 in Fig. 2 comprises a recording screen 65 such as a photographic emulsion, and on the face thereof a plurality of lenses 66.

The operation of the film shown in Fig. 2 in making a record by scanning a subject being photographed is in some respects analogous to the operation of the film shown in Fig. 1. Thus in Fig. 2 the light ray 53 from the upper end of the subject 52 passes through the aperture 51 and strikes one of the lenses 66 which when in the position shown in Fig. 2 refracts the light ray 53 so as to fall at point $a$. The ray 54 passing through the axis of the hole 51 is shown in Fig. 2 as passing through the center of one of the lenses 66, and falling at the point $b$ on the recording screen 65. The ray 55 passes through the hole 51 and is refracted by one of the lenses 66 so as to fall on the point $c$.

In Fig. 2A the film shown in Fig. 2 is shown as having been moved throughout a portion of the length of one of the lens elements with respect to the hole 51 by any suitable means such as that shown in Figs. 30 and 31, for example. It is seen that the ray 53 now falls on a different portion of one of the lenses 66 but since it strikes a different portion of the curvature of the lens it is refracted and falls at the same point $a$ on the recording screen 65. Similarly rays 54 and 55 likewise fall at points $b$ and $c$ which are the identical points at which the rays fell on the recording screen 65 when the screen was in the position shown in Fig. 2. The same result is attained in all other positions of the film during the movement thereof. Thus the subject 52 is scanned by the lenses 66 so that as the film 64 is moved upwardly, for example, as shown by the arrow in Fig. 2, the subject 52 is successively scanned by each of the lenses 66 and as the film passes upwardly beyond the film gate formed by members 61, complete condensed inverted images 52' of subject 52 are formed on the recording screen 65.

In connection with the modification shown in Fig. 2 it is desirable to have each of the images 52' substantially completely fill the space immediately behind each of the lens elements 66. This can be controlled by adjusting the spacing of the film 64 from the hole 51, by adjusting the thickness of the film 64, by adjusting the spacing of the gate members 61 and by the character of the lens elements 66 (including such factors as the curvature thereof and the index of refraction of the material used); but the capacity of the lens elements to bring parallel rays (at least in a plane intersecting the film longitudinally) to approximately the same point behind the lens elements should be retained.

It is apparent that by placing a source of illumination behind the film 64, light rays traveling in a direction the reverse of that described above can be projected through the lenticular film, through the hole 51 and onto a suitable screen, not shown, and that when the film 64 is moved with reference to the film gate by any suitable means such as that shown in Figs. 30 and 31, for example, the projection of motion pictures will be accomplished.

While reference has been made above to the use of a composite film, it is understood that in the ordinary case the recording screen such as a photographic emulsion is on one side of a film and that the scanning screen such as a grating or lens structure is on the other side of the same film and integral therewith. This insures accurate registration of the scanned images behind the elements of the scanning screen. However, it is apparent that the composite film can be made of separate parts one of which would include a recording screen such as a photographic emulsion, and the other of which would include a scanning screen including scanning elements such as a grating or lens structure. Such separate elements could be brought into association, e. g., at the film gate, and have independent or cooperating means for moving same or could be cemented together and moved conjointly. These considerations apply to the diagrammatic representation shown in Figs. 1 and 2 and likewise to the disclosures and examples hereinbelow set forth.

It is to be understood that the foregoing descriptions of this invention in connection with a pin-hole camera have been primarily for the purpose of describing the principle upon which the subject being photographed can be scanned according to this invention. More highly perfected apparatus are of course desirable for normal commercial work. One form of apparatus which is nevertheless of quite simple character is, however, described in connection with Fig. 3. In this figure a usual type of photographic lens 67 is shown. The lens 67 may comprise several parts 68, 69, 70 and 71, which may be such as described in United States Patent No. 1,360,667 to Minor, but it is to be understood that any other suitable arrangement of primary and corrective lens structures can be used. The lens structure 67 is interposed between an object 72 to be photographed and the film 74. The film 74 is at the image plane of the lens structure 67. The film 74 is similar to the film shown in Figs. 2 and 2A and comprises a recording screen 75, such as photographic emulsion, and spaced therefrom a plurality of lens elements 76 which may be either of the spherical or cylindrical type. If lens structures of the cylindrical type are used, these extend laterally across the elongated motion picture film.

When reference is made herein to a lens structure of spherical type, it is understood that one or more of the lens surfaces is substantially in the form of a portion of a sphere. The curvature may be double concave, double convex, concavo-convex, plano-convex, plano-concave, etc. The lens elements in the objective lens structure 67 are of spherical type and illustrate different combinations of curvatures which spherical type lenses (as that term is used herein) may take.

When reference is made to cylindrical type lenses herein, it is understood that one or more of the lens surfaces is substantially in the form of portions of a cylinder. The combinations of curved and/or plane surface may be analogous to those mentioned above in connection with spherical type lens.

When lens elements of either spherical or cylindrical type are embossed on the surface of the film they are normally of the plano-convex type and function in the way that plano-convex lenses function.

At the secondary nodal plane or diaphragm of the lens structure 67 is placed a stop 77. This stop may be merely a hole, as shown in Figs. 1 and 2, but is preferably in the form of an elongated slit which extends horizontally across the lens structure, assuming that the elongated film is positioned vertically. The thing that is important is that the slit be disposed transversely with respect to the longitudinal extent of the motion picture film.

If the rays of light 79 from the upper end of the subject 72 are traced through the lens structure 67, it is seen that they will go through the slit 78 and fall on one of the lens elements 76 of the film 74. Since the lens elements are of the plano-convex type the rays of light 79 will be contracted to a minute area or point p' corresponding to a point p at the upper end of subject 72. Similarly rays of light 80 from the lower end o of subject 72 will be condensed to a minute area or point o' behind another of the lens elements 76 but at approximately the other extremity of the area on the emulsion behind the lens elements in a direction corresponding to the longitudinal extent of the film. If the composite film 74 is moved upwardly (or downwardly) as indicated by the arrow by sprocket wheel 292 or any other suitable means such as that shown in Figs. 30 and 31, for example, it is seen that as it passes the film gate formed by members 81, scanned images 72' of the subject 72 will be formed behind each of the lens elements 76 during the progress of the film past the film gate. As the film 74 is continuously moved past the film gate, any movement in subject 72 will be faithfully recorded in the minute images 72' which are formed by successively scanning the subject 72.

As aforesaid, it is preferable that the area of images 72' correspond to the area of the lens elements in front thereof. In order to utilize a maximum amount of the light entering the camera lens, the width (suitably adjustable by means not shown) of the aperture 78 should be as great as is consistent with obtaining a clear record of scanned image on the photographic emulsion.

The optical set-up for projecting motion pictures using a composite film made with the apparatus shown in Fig. 3 may be made substantially identical with the apparatus shown in Fig. 3 except that the projector normally would use a lens having a longer focus than the objective lens used in making the initial photograph. The width of the aperture 78 in the screen 77 in projection would preferably be made as great as is consistent with the production of a clear image on the viewing screen. Upon illuminating the film as by source of light 250 each point on the record portion thereof would be magnified by the lens element in front of such points to cause a beam of light to go through the projecting lens structure and brought to a focus on a suitable viewing screen (e. g. at O—P). During the projection and regardless of the motion of the film past the film gate, each portion of the images behind the lens elements would fall at a corresponding point which remains stationary on the viewing screen and any motion of the subject originally photographed and successively recorded in the different images in back of the lens elements would be apparent to one viewing the image on the viewing screen.

In the apparatus described in connection with Fig. 3 it is apparent that the lens structure 67 serves to bring light from points laterally disposed with respect to the slot 78 to a focus on the film 74 from a variety of directions but that the structure imposes a definite limitation as to the angle at which light from points in the subject which are disposed in the direction corresponding to the longitudinal extent of the film, fall upon the film. The angle at which the rays from each of such longitudinally disposed points falls on the film is different from the angle at which rays from each of the other of such points falls on the film, the angle referred to being the angle disposed longitudinally with reference to the longitudinal extent of the film. It is understood that an angle thus referred to is in a plane which intersects the film along a longitudinally extending line of the film.

It is normally desirable to increase the total amount of light that is transmitted through the lens structure as much as possible. This may be done as will be described below. In order to illustrate the principle involved in this modification of this invention, reference is made to Figs. 4 and 5. If an object is at the principal focus of an ordinary convex lens rays from any point of the object when emerging from the lens on the opposite side thereof will be parallel. If another convex lens is placed in the path of these parallel rays with its axis parallel to the principal axis of the first rays then the light rays can be brought to a point of focus by the second lens. The second lens will therefore produce an inverted image of the object within the field of the first lens. In Fig. 4 a candle 85 is shown which is at the principal focus of the lens 86. Light from any point in the candle 85 will therefore emanate from the opposite side of the lens 86 in the form of parallel rays. If a lens 87 is placed in the path of these parallel rays, the rays can be brought to a focus again. Behind the lens 87 and at the focal plane thereof for parallel light a real inverted image 85' of the candle will be formed. If a number of small lenses are used as shown in Fig. 5, a small image 85' of the candle 85 will be formed behind each of the small lenses. Since the rays of light between the lens 86 and the several lenses 87 are parallel, it is apparent that the lenses 87 can be moved transversely with respect to the optical axis of lens 86 and that during the motion of the small lenses the images 85 will remain undisturbed behind each of these lenses so long as the lenses 87 are in the path of the parallel rays of light emerging from lens 86.

When reference is made to a film, for example, being transverse to the optical axis of an optical structure such as an objective lens, the optical axis is to be distinguished from the physical axis of the optical structure, for the optical axis might have its direction changed by mirrors, totally reflecting prisms and the like. Similarly when two optical structures (e. g. an objective lens and a compensating lens) are referred to as having the same optical axis, these structures need not have the same physical axis, as the direction of the optical axis might be changed between them.

If in place of a plurality of small lenses a lenticular film is used which comprises a lenticular structure comprising substantially similar spherical type lenses on the face thereof and has on the opposite side thereof a photographic emulsion at the focal plane for parallel light of the lens elements of said film, it is apparent that a plurality of images of the candle would be recorded on the emulsion notwithstanding the fact that the film was moved during the exposure of the photographic emulsion to light from the light source. This phenomenon is due, as aforesaid, to the fact that the rays of light emanating for any given point of subject 85 and traveling from the lens 86 to the small lenses 87 are parallel. With this optical arrangement the light from any one point of the subject will fall at one point only behind each of the small lenses as the subject is scanned by the lenses regardless of the motion of the small lenses with reference to the principal objective lens.

In Fig. 6 an optical arrangement is shown which is suited for photographing distant objects. In this case a lenticular film 90 has been substituted for the individual lenses shown in Figs. 4 and 5. The film 90 comprises an object screen 91 which may consist of photographic emulsion and a lenticular scanning screen 92 which consists of a plurality of substantially similar spherical lenses. A subject 93 to be photographed is at a distance from the lens 94. In order that the light between the lens 94 and the film 90 may consist of parallel rays as far as light emanating from any single point in the subject 93 is concerned a compensating lens 95 is used. The compensating lens 95 in effect produces a virtual image 96, and light emanating from any one point in this virtual image travels from the lens 94 to the film 90 in the form of parallel rays. With this structure small inverted images 96' of virtual image 96 are produced on the emulsion 91 and since the rays of light striking the emulsion from any one point of the image 96 always strike the emulsion in the same place behind the lens elements, the points in the images 96' behind each of the lens elements which correspond to points in the image 96 remain the same regardless of the motion of the film relatively to the lens structure during exposure.

A portion of the film 90 is shown enlarged in Fig. 7. It is seen that the bundle of parallel rays 97 which come, for example, from the bottom of the subject 93, come to a focus on the emulsion 91 at the upper limit of the width of the area behind the lens element 92. Similarly the bundle of parallel rays 98 from the top of the subject 93 come to a focus at the lower limit of the width of the area behind lens element 92. It is desirable to have the images 96' occupy the full extent of the area behind these lens elements but not to overlap into areas behind adjacent lens elements and this relationship also applies to other modifications of this invention elsewhere described herein. This can be accomplished by controlling the thickness $t$ of the film and the radius $r$ of the lenses 92 in relation to the angle at which marginal rays from the subject being photographed strike the scanning lens elements.

After the subject has been photographed on the special motion picture film, the projection can be accomplished using apparatus similar to that described above, a light source (not shown) being placed so as to transmit rays of light in the reverse direction of that above described through the film, through a projecting lens structure, and onto a suitable viewing screen.

An ordinary type of objective lens 99 is shown in Fig. 8. The lens shown is of a compound type of which very many are known and includes elements designed to correct aberrations, etc. Such a lens can be used according to this invention by placing the compensating lens 100 in front thereof. The compensating lens is shown as a double concave lens but it may also be a plano-concave lens or a concavo-convex lens. The compensating lens can be made in one or more pieces and of any suitable material. Such a compensating lens is especially suitable in connection with a camera lens of fixed focus. Using the compensating lens such as that shown in Figs. 8 and 8A motion pictures can be photographed in the manner above described in connection with Figs. 6 and 7. When a compensating lens is used in the manner above described, and as will be described below, the compensating lens may be considered as part of an objective or projecting lens structure.

A preferred type of apparatus to be used in the making of motion pictures according to this invention is shown in Fig. 9. In this apparatus a suitable objective lens indicated generally by the reference character 101 may be used. In this instance the objective lens is composed of elements 102, 103, 104 and 105 and may comprise any well known type of objective lens which is preferably adapted to make corrections for aberrations, diffraction, etc. At the nodal point of the lens is a diaphragm 251 which is preferably adjustable so that the working diameter thereof can be changed. Spaced from the objective lens is a shield member 106 having an image aperture 107 therein. Still further removed from the objective lens is a compensating lens structure 108 of spherical type which may be composed of two members 109 and 110. At the back of the camera is film gate shield 111 having film gate 112 therein. Immediately behind the film gate 112 is a composite film 113 composed of an object screen 114 such as photographic emulsion, and a scanning screen 115 comprising a plurality of lens elements of spherical type.

Figure 10:
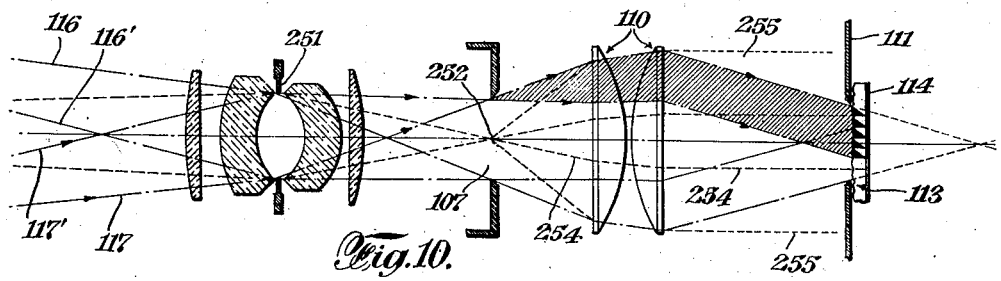
Fig. 10 is a side diagrammatic view of the apparatus shown in Fig. 9 which indicates the paths of certain rays through the different optical structures.

The functioning of the device is illustrated in Fig. 10. Rays of light 116 and 116' are rays entering the objective lens after having originated at some single point (e. g. at the upper limit of the field of the objective) of a subject being photographed. These rays are brought to a focus at the image aperture 106. Similarly two other rays 117 and 117' from, for example, a lower point of the subject being photographed enter the objective lens and are brought to a focus at the image aperture as shown. It is apparent that all the rest of the rays from individual points of the subject being photographed also come to a focus at the image aperture and that a real image is formed at this point. However, instead of recording the image on a photographic emulsion at the image aperture, the rays of light are permitted to pass through the compensating lens 110. The action of the compensating lens structure 110 is similar to that above described in connection with Figs. 5, 6 and 7. Thus if a source of light were placed at the image aperture, e. g., at point 252, the light therefrom would emanate as a bundle of parallel rays 255 from lens structure 110. In other words, the image aperture is at or substantially at the focal plane for parallel light of the compensating lens structure. As a matter of fact the light at point 252 comes from a point at the approximate center of the subject being photographed and since the angle at which rays come to focus at point 252 is limited by the aperture of the diaphragm 251, the angle at which light passing through point 252 falls upon compensating lens structure 110 is limited as shown by rays 254, but these rays emanate from the lens structure 110 in parallel relation and fall upon film in this relation. The compensating lens structure 110 also causes the rays 116 and 116' to emanate from the compensating lens structure 110 as a bundle of parallel rays. The rays 117 and 117' fall on the record screen in parallel relation but from another direction. Thus all of the rays from each point of the subject being photographed fall on the film from one direction only. Consequently as the film is moved past the film gate 112 by sprocket wheel 292 or any other suitable means such as that shown in Figs. 30 and 31, for example, light from any one point of the subject being photographed falls at one point only of the image recorded on the photographic emulsion behind each of the lens elements regardless of the motion of the film. Thus with this apparatus, as with the simpler forms hereinabove described, the subject being photographed is scanned by each of the scanning elements of the scanning screen at the front of the film and behind each of the scanning elements a condensed non-inverted image of the subject is produced.

With the apparatus above mentioned, it is apparent that the diameter of the objective lens used may correspond to that which is in general use for motion picture work. However, since there is no moment when the light does not fall upon the photographic emulsion, it is apparent that the effective light falling on the film is greatly increased as compared with intermittent photography, as in intermittent photography it is necessary to shut off the light during the movement of the film between each successive photograph.

The image aperture may be approximately the same as the aperture of the objective lens. In such case the corrective lens structure would have a greater working diameter than that of the objective lens. Thus if the working diameter of the objective lens were about the same as the image aperture and if the focal lengths of the objective and corrective lenses were about the same then the working diameter of the corrective lens system would be about three times that of the objective lens.

In tracing marginal rays 116 and 116' on the one hand and 117 and 117' on the other hand it is seen that the bundles of parallel rays converge after having passed through corrective lens structure 110. The film gate 112 can be placed so that the converging light rays will cover a desired area on the motion picture film. As has been said hereinabove, it is desirable that the thickness of the film and the diameter and radius of the lens elements thereof be such that the light rays falling thereon will substantially fill the whole area but no more behind each lens element. The diameter of the compensating lens structure and the angle at which light rays therefrom strike the film gate, should preferably be such as to function in this way with a film of given specifications. In commercial work it is regarded as preferable to adopt a film of standard specifications. The optical structure of the camera could then be adapted as desired to cooperate with the film in carrying out this invention. The foregoing remarks as to the working diameters of the various optical structures and devices also applies to other modifications herein described and is to be understood in connection therewith.

While a particular type of compensating lens structure is shown in Figs. 9 and 10, it is to be understood that other types of lens structures can be used. Thus the lens structure described in the Minor patent hereinabove mentioned may be used as a compensating lens structure and is desirable because it is corrected for aberrations. A compensating lens of short focal length and high corrective value is preferred.

The objective lens may be adjustable so as to bring either near or distant objects to a focus at the image aperture depending upon the position of the subject that is to be photographed. This will affect somewhat the angle at which the various rays pass through the different optical structures and thus affect the angle at which rays of light strike the film at the film gate. However, by varying the diameter of the diaphragm 251, the angle at which rays strike the film gate can be maintained constant so that the desired area on the emulsion behind each of the lens elements will be filled in the manner above described in scanning the subject. These remarks are also applicable to the modification herein below described.

Figure 11:
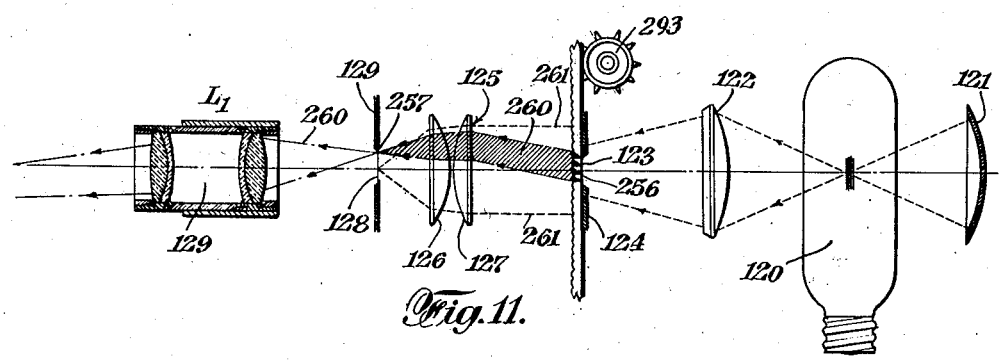
Fig. 11 is a side diagrammatic view of projecting apparatus which apparatus is of generally similar character to that shown in Figs. 9 and 10.
Figure 11A:
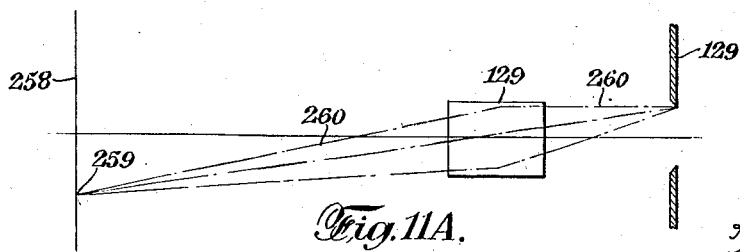
Fig. 11A is a side diagrammatic view of a portion of the apparatus shown in Fig. 11 which shows the paths of certain rays of light from the projecting lens structure to the viewing screen.

When the record that has been photographed is to be projected, an optical arrangement can be used which in general is similar to that described above. Such projection apparatus is shown diagrammatically in Fig. 11. In this figure there is a source of light 120 which is directed toward the film gate 123 in shield 124 by the reflector 121 and by a suitable condenser 122. The light rays pass through the film gate and film and the light from each point on the emulsion side of the film is magnified by each of the lens structures so as to pass to the compensating lens as beams or bundles of parallel light. The compensating lens 125 is such as to bring parallel light rays such as rays 261 (in dotted lines) to a focus at the image aperture 128. The light rays from corresponding points behind each of the plurality of lens elements will emerge as parallel rays all traveling in a similar direction from all of the lens elements in front of the film gate. The bundles of parallel light that are directed through the compensating lens structure 125 (which is shown as comprising the lens elements 126 and 127) are focussed at separate points at the image aperture 128 in shield 129. Thus light rays 260 from corresponding points 256 on the emulsion all travel to the compensating lens 125 as parallel rays but are brought to point 257 at the image aperture. Similarly, all of the rays from all of the corresponding points behind the different lens elements of the film are brought to a focus at their appropriate points at the image aperture. The light passing through the image aperture 128 then passes on and through the projecting lens structure 129 (see Fig. 11A). Still further tracing the light rays, it is seen that the rays are directed by the projecting lens structure so as to ultimately come to a focus on a suitable viewing screen 258. Tracing the light rays 260, it is seen that they will ultimately come to a focus at a stationary point 259 notwithstanding the continued motion of the film. When the film is moved past the film gate by sprocket wheel 293 or any other suitable means such as that shown in Figs. 30 and 31, for example, it is apparent that any motion of the subject originally photographed will be viewable on the viewing screen.

In the apparatus above described in connection with Figs. 9, 10, 11 and 11A, compensating lens structures of the spherical type have been used with a scanning screen having spherical lens elements. When the scanning lens elements of the film are of the cylindrical type extending across the film, a modified form of photographing and projecting apparatus should be used such as that shown in Figs. 12, 13, 14, 14A and 14B. In Fig. 12 an apparatus is shown having an objective lens structure 140 behind which is placed a screen 141 having image aperture 142. The objective lens is of any suitable type, many of which are well known, and is operative to produce an image of a subject being photographed at the image aperture 142. The objective may include a diaphragm 280 the diameter of which may be adjusted as desired. At the back of the camera is a film gate 143 in shield member 144. Behind the film gate 143 is a film 145 having photographic emulsion 146 on the back thereof and a plurality of lenticular cylindrical ridges 147 extending crossways on the face thereof. Interposed between image aperture and the film gate 143 are compensating lenses of special type. The first two of these lenses, namely, lenses 148 and 149 comprise a unit which is designed to bring to a focus rays of light traveling in a horizontal plane from any one point of a subject being photographed after having passed through the image aperture 142. This pair of lenses causes rays of light emanating from a single point of the subject being photographed and traveling in a horizontal plane after having passed through a point of focus at the image aperture 142, to be again focussed at the film gate aperture 143. The other pair of lenses 150 and 151 serve to cause light emanating from any single point of the subject being photographed to emanate therefrom in parallel relation in a vertical plane, it being understood that the film moves vertically, for example driven by sprocket wheel 294 or by any other suitable means such as that shown in Figs. 30 and 31, for example.

For the purpose of illustration, the rays of light from a point of the subject at the axis of the objective lens may be followed. The rays of light are brought to a focus by the objective lens at the center of the image aperture 142. From this aperture the rays of light tend to spread horizontally as shown by the shaded portion 152. But the horizontally spreading rays are caused to converge again by the lenses 148 and 149 as shown. The rays of light which tend to spread vertically after having passed through the center of the image aperture 142 are caused to become parallel after they pass through the lenses 150 and 151. Thus light from a point of the subject at the axis of the objective lens is caused to fall on the film along a line extending longitudinally of the longitudinal extent of the film, and all of the rays from this point strike the film from the same angle with reference to the longitudinal extent of the film.

In Fig. 13 the rays from the top and bottom and two sides of the subject being photographed are traced through the apparatus. The rays from points at either side of the subject being photographed are brought to focus at the image aperture at points 160 and 161. The rays brought to focus at 160 at the image aperture are refracted by the lenses 148 and 149 so as to strike the film gate aperture 143 at the edge thereof and the lenses 150 and 151 cause these rays to fall on the film gate aperture in parallel relation to each other as far as any plane intersecting the film longitudinally is concerned. The path of this particular bundle of rays, after meeting at the point 160, in a horizontal plane, is shown by the shaded portion 162 and it is seen that this bundle of rays falls at the margin of the film gate 143. The light coming to a focus at 161 travels in a horizontal plane as shown by the shaded area 163 and comes to a focus at the opposite side of the film gate. Light emanating from individual points in the image aperture and in other planes intersecting the film 145 transversely also come to a focus at the film gate aperture because of the action of lenses 148 and 149.

Rays coming to a focus at the top of the image aperture 142 at the point 164 are brought into parallel relation with respect to each other by lenses 150 and 151. These rays falls on the film along the line at approximately the center of the film gate from top to bottom thereof and they all strike the film at the same angle with reference to the longitudinal extent of the film. The path of these rays is shown by the shaded area 165. Light coming to a focus at the bottom of the image aperture 142 at point 166 follows the shaded area 167 and also comes to a focus along the same line at which the rays coming to a focus from point 164 of the image aperture fall. But the rays of shaded area 167 fall upon the film at a widely different angle from the rays of shaded area 165 with reference to the longitudinal extent of the film. Since each of the lenses of the scanning screen on the face of the film bring rays parallel in a plane intersecting the film longitudinally to a point, it is seen that the rays coming from points from the top to the bottom of image aperture 142 are recorded independently on the emulsion on the back of the film. Likewise the rays from points laterally disposed across the image aperture are brought to independent points on the emulsion because of the focussing action lenses 148 and 149. Thus, when the film is moved past the film gate the subject being photographed is scanned without any confusion of images (which are upright when the film is moved vertically) behind the cylindrical lens elements of the film. Any motion in the subject being photographed is therefore recorded on the successive areas behind each of the lens elements of the film as the film goes past the film gate.

The projection of a record made by photographic apparatus such as that shown in Figs. 12 and 13 is illustrated in connection with Figs. 14, 14A and 14B. The record on film 145 may have been developed as by reverse printing process so as to have been changed from a negative to a positive. In such case the record screen 146 and the lenticular scanning screen 147 will be the same as described above in connection with Figs. 12 and 13.

In projecting, a suitable light source 175 (see Fig. 14) may be used together with a reflector 176 and a condenser lens 177 which cause the light to be directed to and through the aperture 178 in film gate shield member 179. Between the film gate aperture 178 and the image aperture 180 in shield member 181 are positioned two compensating lens structures. One of these structures is shown as including cylindrical lenses 182 which are adapted to bring light which strikes them in parallel relation in a plane intersecting the film 145 longitudinally from the film gate aperture to a focus at a point at the image aperture. The lens structure 183 is also shown as comprising two parts and is adapted to bring diverging light rays emanating from the film at the film gate aperture in planes intersecting the film 45 transversely to a focus at the image aperture. In this manner the scanned views on the emulsion 146 behind the cylindrical scanning elements produce an image at image aperture 180. In front of the image aperture is a projecting lens structure 183 of usual type which is adapted to project the image at the image aperture onto a suitable translucent or reflecting viewing screen 195.

The paths of certain rays of light through the projecting apparatus will now be described, in order that the action of the projecting apparatus may be better understood. It is apparent that light from corresponding points 185 (see Fig. 14A) on the recording screen 146 will be magnified by the lenses 186 of the scanning screen 147 so as to emanate as rays 190, all of which travel in parallel relation to each other at least in planes which intersect the film 145 longitudinally thereof. Similarly rays from corresponding points 187 pass from the cylindrical lens elements of the scanning screen as rays 191 in a similarly parallel relation. The rays 190 are converged by lens structure 182 to a point 193 at the top of the image aperture 180, for example. The rays 191 are converged by the lens structure 182 to a point 194 at the bottom of the image aperture 180, for example. Other points between points 185 and 187 behind the lenses 186 on the recording screen light will be brought to corresponding points between points 193 and 194 at the image aperture. The rays from points 185 and 187 and intermediate points also have rays of light emanating therefrom which diverge in planes which intersect the film 145 transversely. Such rays are brought to a focus at the image aperture by the compensating lens structure 183. Thus all rays which emanate from points 185 are converged at the single point 193 at the image aperture. The same is true of all other points at the image aperture. Moreover, since the rays emanating from the scanning elements on the film maintain their same position relative to the compensating lenses 182 and 183 during the motion of the composite film, the image at the image aperture is not blurred.

The image at the image aperture may then be projected onto the viewing screen 195 in any suitable way as is well known. In order that the rays may be traced in projection, reference is made to Fig. 14B. The rays 190 which pass through the point 193 of the image aperture pass divergently into the projecting lens structure 183 and are again brought to a focus at the viewing screen 195. In a similar way, the rays from all the points at the image aperture are projected so as to reproduce the image at the image aperture on the viewing screen 195.

If the motion picture film is maintained stationary in the projecting apparatus, a stationary picture will be seen on the viewing screen. As soon as the motion picture film is moved relatively to the projecting apparatus, however, as by sprocket wheel 295 or by any other suitable means such as that shown in Figs. 30 and 31, for example, the picture projected on the viewing screen will reproduce the motion of the subject originally photographed, the rate of motion depending on the rate of motion of the film.

For use in connection with motion picture photography and projection of the character heretofore described, various types of films may be used such as shown in Figs. 15 to 29. In Figs. 15 and 16 a motion picture film 200 is shown on the surface of which is embossed a plurality of contiguous spherical lens elements 201. On the back of the film is a suitable recording medium such as a photograph emulsion 202. This type of film is adapted for use with all of the different apparatus described above but is especially adapted to be used with the apparatus shown in Figs. 8, 8A, 9, 10, 11 and 11A.

In Figs. 17 and 18 the motion picture film 203 is shown, on the surface of which are embossed a plurality of cylindrical ridges or lenses 204. On the back of the film is a suitable photographic emulsion 205. This type of film is especially adapted for use in connection with the apparatus shown in Figs. 12, 13, 14, 14A and 14B. It may also be used in connection with the apparatus shown in Figs. 2, 2A and 3.

In Figs. 19 and 20 a photographic film 206 is shown which has on the surface thereof a grating consisting of opaque transverse lines 207 between which are transparent bands 208. This type of film is adapted for use with apparatus shown in Figs. 1, 3, 12, 13, 14, 14A and 14B but is less desirable than the film shown in Figs. 17 and 18.

In the films shown in Figs. 15 to 20, it is to be noted that no perforations are used which are adapted to coact with sprocket wheels. In moving the film continuously there is no necessity for sprocket wheels as in the intermittent projection of motion pictures heretofore practiced. If desired, however, a film suitable for use in connection with sprocket wheels may be adapted for use according to the present invention. Thus in Fig. 21 and 22 a film 210 is shown of usual type with perforations 211 along the margins thereof. Adjacent one margin is a sound track 212. However, between the margins of the film, the film is embossed with spherical lenses of the type shown in Figs. 15 and 16.

Similarly when cylindrical lenses are used, the cylindrical lenses 214 (see Figs. 23 and 24) may be placed between sprocket holes 211' along the margin thereof and alongside the sound track 214.

As a further modification, reference is made to Fig. 25. In this figure the film 215 has sprocket holes 216 along only one margin thereof. Along the other margin thereof are two sound tracks. This type of film also carries an emulsion on the back thereof and is suitable for carrying two sound records such as one record for conversation and a second record for musical accompaniment or for recording biaural sound effects. In this modification the lens structure on the face of the film comprises spherical lenses 217.

In Fig. 26 the film 219 is essentially the same as that shown in Fig. 25 except that instead of using spherical lenses the face of the film is embossed with cylindrical ridges 221.

In Fig. 27 a motion picture film 225 is shown having a series of perforations 226 along one margin thereof and a sound track 227 along the other margin thereof. Between the margins is a grating similar to the grating shown in Figs. 19 and 20 and in the back of the film is a photographic emulsion.

In Fig. 28 a film 282 is shown having sound tracks 283 along either margin thereof with lenticular ridges 284 on the face thereof between the sound tracks (an emulsion being on the back thereof).

In Fig. 29 a film 285 having sound tracks 286 along the margins thereof and spherical type lens elements 287 therebetween is shown (an emulsion being on the back thereof).

The lenticular film of the character above described is ordinarily used in the practice of this invention by moving it continuously with relation to photographic apparatus and with relation to projecting apparatus. If, however, the lenticular film has to be used with an old type of intermittent apparatus, it will still operate. If lenticular film is used, the subject being photographed would be recorded in a composite manner behind the lens structures. Thus if the film were maintained stationary, the film shown in Fig. 17 for example would be adapted to make a photograph occupying the area 234 shown in dot and dash lines in Fig. 17 for example. The photograph would not be visible to the eye as a picture inasmuch as it would be resolved into elements by the action of the lenses but when projected the light rays would reverse themselves and would produce a picture on a viewing screen. Thus the lenticular film or a grating could be used in ordinary intermittent photography. The film thus produced would, of course, have to be projected using a projector having an intermittent action but not necessarily an intermittent shutter. Fig. 17 also illustrates how the area of the film used for recording an image can be increased by avoiding the necessity for perforations in the practice of this invention.

Furthermore, if a lenticular film or a film having a grating on the face thereof is moved continuously in making photographs as hereinabove described according to this invention, such film can be used in a projector of the intermittent type. In such case the subject that was originally photographed would be successively projected while the film was held stationary at intervals of the length of the film, and a motion picture of ordinary type would be produced. Wherever intermittent motion is used, however, the numerous advantages of the continuous motion would not be availed of according to the present invention.

Films such as those hereinabove described and used in the practice of this invention may be made of any suitable material such as cellulose acetate, cellulose nitrate, gelatine and the like. The material used in the present motion picture film is well-suited for use in the practice of the present invention. The characteristics of the lens elements used on the film are dependent to a large extent upon the thickness of the film that is used. A photographic film having a thickness of .006 inch is desirable. The lens elements, either of the spherical type or of the cylindrical type, on the face of the film should be adapted to bring beams of parallel light striking the lens elements to a focus at the emulsion plane on the other side of the film in the preferred apparatus described above. Moreover, the lens elements should, as hereinabove described, be adapted to cause all the beams of light striking a lens element at different angles to fall within the area on the emulsion which is behind the lens element and preferably this area should be completely filled. The lens elements numbering about 750 to the inch may, for example, be used. In order that the film may be as durable as possible, it is preferable to make the curvature of the lens elements neither excessive, on the one hand, nor too slight, on the other hand. If the curvature is excessive, light rays are adversely affected by fillets between the lens elements. If the curvature of the lens elements is too slight, it is difficult to accurately emboss them. As aforesaid, in the commercial practice of this invention it would be desirable to select a certain standard specification for the film.

The emulsion on the back of the film may be of any well known type. The words "photographic emulsion" are used herein to refer to any suitable material which is sensitive to light rays and is adapted to make a photographic record upon exposure to light rays. The photographic speed of the emulsion may be selected as determined by the quality of the light used in illuminating the subject, the reflective power of the subject, the size of the effective aperture of the camera and the like as in ordinary photography. These matters are well known and need no further explanation herein.

In cinematographic work in accordance with the present invention, it may be necessary to shut off the light rays completely, for example, either before or after use of the apparatus and when the film is at rest. In such case the diaphragms hereinabove shown may be adapted to close altogether or a suitable cap may be used to cover the objective or projecting lens structure. Moreover, an independent shutter of any known type may be used for this purpose.

After the exposure of the film, it is assumed that the film will be properly developed. A suitable positive can be made by the well known chemical reversal process for transforming a negative into a positive by chemical means. Likewise, positives can be produced by known printing methods from the negative.

As hereinabove stated, it is not necessary to use sprocket wheels and co-operating perforations in the film when continuous methods of photography and projection are employed according to this invention. Accordingly, it is proposed in the practice of this invention to use cinematographic apparatus wherein the film is guided by contact and tension rollers at the film gate, which while serving to position the film, reduce friction and minimize the possible accumulation of static charge on the film. While these rollers may be fitted with sprocket teeth, if desired, it is sufficient if the rollers are flanged to furnish an accurate guide for the edges of the film strip.

Apparatus of the character referred to above is shown in Figs. 30 and 31. In these figures, the back member 290 or other suitable portion of either a camera or projector is provided having an opening therein in which tapering walls 291 are set that terminate in a film gate 262. In order to guide the film past the film gate, guide rollers 263 are provided having suitable flanges 264 that co-operate with the margins of the film to guide the film past the film gate. Pressure rollers 265 are provided which are adapted to maintain pressure on the film 266 which is between the pressure rollers 265 and the guide rollers 263. The pressure rollers 265 may be urged against the guide rollers 263 by any suitable means, e. g. by mounting the pressure rollers 265 on levers 267 which are hinged at 268 and which are urged toward guide rollers 263 by springs 269. Further guide rollers 270 are provided which likewise have flanges 271 thereon. In order to maintain the speed of the film constant, any suitable means may be used such as a constantly rotating power driven drum 272 against which the film is urged by any desired number of pressure rollers 273. The film can then pass to suitable reels (not shown) in the usual way. A suitable tension roller 274, which is adapted to maintain the film at desired tension, may be provided. This tension roller may be mounted on a lever 275 which is urged against the film by a spring 276. Such an apparatus may be used either in a camera or in a projector. When a projector is used, a suitable source of light (not shown) can be placed behind the film gate.

The apparatus above described for continuously moving a photographic film past a film gate may take many different forms and it is to be understood that the apparatus shown in Figs. 30 and 31 are merely illustrative of one type of apparatus which can be used.

It is also to be understood that the optical structures, cameras, projectors and the like above described are merely illustrative and that there are other ways of practicing this invention and that there are other structures which embody this invention. However, it is believed that the foregoing description gives a good understanding of this invention which is claimed as follows.

We claim:

1. Cinematographic apparatus which comprises a shield having an image aperture, a second shield spaced from the first shield having a film gate therein, a conjugate focal lens structure that has an image plane at said image aperture and that is on the remote side of said image aperture from said film gate, a compensating lens of spherical type between said image aperture and said film gate adapted to cause rays of light meeting at a point at said image aperture to travel in parallel relation between said compensating lens and said film gate, a film having an emulsion on one side thereof and a plurality of lens elements of spherical type on the other side thereof between the emulsion and the compensating lens, said emulsion being approximately at the focal plane for parallel light of said lens elements and means for continuously moving said film and lenses integral therewith transversely past said film gate.

2. Cinematographic apparatus which comprises a shield having an image aperture, a second shield spaced from said first shield having a film gate therein, a conjugate focal lens structure that has an image plane at said image aperture and is on the remote side of said image aperture from said film gate, two compensating lens structures of cylindrical type at approximately right angles to each other on the same optical axis, one of said compensating lens structures being adapted to cause rays of light meeting at a point at the image aperture to travel in parallel relation to a primary plane between said compensating lens structure and said film gate and the other of said compensating lens structures being adapted to cause rays of light travelling in planes outside of said primary plane to come to a focus in their respective planes at said primary plane, a film having an emulsion on the side thereof remote from said compensating lens structure at the point where light in said outside planes comes to a focus, means for moving said film past said film gate in a direction corresponding to the direction of the line at which said primary plane intersects said film, and a plurality of cylindrical lens elements extending across said film on the face thereof adjacent said compensating lens structures at approximately right angles to the direction in which the film is adapted to be moved, said cylindrical lens elements being positioned so that their focal plane for parallel light will be approximately at the plane of the emulsion.

3. Cinematographic apparatus which comprises an elongated film having a series of cylindrical type lens elements disposed transversely on one side thereof and an emulsion on the other side thereof at the focal point for parallel light rays travelling in a plane intersecting said film longitudinally, stationary lens means at the far side of said lens elements from said emulsion adapted in conjunction with said cylindrical lens elements to direct light between a point of focus on the far side of said lens means from said film and a conjugate point of focus at the emulsion plane of said film with the light rays in a plane intersecting said film longitudinally travelling in parallel relation between said lens means and said cylindrical lens elements and with light rays in a plane intersecting said cylindrical lens elements longitudinally converging between said lens means and said cylindrical lens elements to a focus at the said emulsion plane of said film, and means for continuously moving said film longitudinally.

4. Cinematographic apparatus which comprises an elongated film having a plurality of adjacent spherical type lens elements carried thereby and distributed both longitudinally and transversely on one side thereof and an emulsion on the other side thereof in a plane at the focal point of said lens elements for parallel light rays, stationary lens means at the far side of said lens elements from said emulsion adapted in conjunction with said lens elements to direct light between a point of focus on the far side of said lens means from said film and a conjugate point of focus at the emulsion plane of said film with light rays travelling in parallel relation between said lens means and said lens elements, and means for continuously moving said film longitudinally.

5. Cinematographic apparatus which comprises an elongated film having an emulsion on one side thereof and a series of lens elements carried on the other side thereof adapted to bring parallel light rays in a plane intersecting said film longitudinally to a point of focus at the plane of said emulsion, stationary lens means at the far side of said lens elements from said emulsion plane adapted in conjunction with each of said lens elements to direct light between a point of focus at said emulsion plane and a conjugate point of focus on the remote side of lens means with the rays of light between said lens means and said lens elements parallel at least in a plane intersecting said film longitudnally, and means for continuously moving said film longitudinally.

6. A method of making a motion picture record on an elongated film bearing a photographic emulsion, which comprises causing rays of light from a subject being photographed to come to a focus at a focal plane and pass beyond said focal plane, then causing rays of light from each point of the subject being photographed to travel in parallel relation at least in planes intersecting said film longitudinally, the parallel rays in each such plane from each point of said subject being different in direction from the directions of parallel rays in such plane from any other point of said subject, then bringing the rays emanating from each point of said subject and including part of said parallel rays in each plane intersecting said film longitudinally to a focal point on said emulsion, recording the focal points on said emulsion and scanning said parallel rays by moving said film longitudinally, the focal points of light from each point of said subject remaining stationary on said film throughout the longitudinal movement of said film.

7. A method of making a motion picture record on an elongated film bearing a photographic emulsion, which comprises causing rays of light from a subject being photographed to come to a focal plane and pass beyond said focal plane, then causing rays of light from each point of the subject being photographed to travel in parallel relation in planes intersecting said film longitudinally, the parallel rays in each such plane from each point of said subject being different in direction from the direction of parallel rays in said plane from any other point of said subject, and to converge in planes intersecting said film transversely to a focus at the emulsion plane of said film, directing part of said parallel rays in each of said planes intersecting said film longitudinally to a focal point at the emulsion plane of said film, which focal point coincides with the point of focus of rays from the same point of said subject converging as aforesaid in a plane intersecting said film transversely, recording the focal points on said film, and scanning said parallel rays by moving said film longitudinally, the focal points of light emanating from each point of said subject remaining stationary on the emulsion plane of said film throughout the longitudinal movement of said film.

8. A method of making a motion picture record on an elongated film bearing a photographic emulsion which comprises causing rays of light from a subject being photographed to come to a focal plane and pass beyond said focal plane, then causing light from each point of said subject to travel in parallel relation, the parallel rays from each point of said subject travelling in a different direction from the parallel rays of light from all other points of said subject, then directing part of said parallel rays from each point of said subject to a focal point at the emulsion plane of said film, recording the focal points on said film, and scanning said parallel rays by moving said film longitudinally, the focal points of light from each point of said subject remaining stationary in the emulsion plane of said film throughout the longitudinal movement of said film.

9. A method of making a motion picture record on an elongated film bearing a photographic emulsion, which comprises causing rays of light from each point of a subject being photographed to travel in parallel relation in planes intersecting said film longitudinally, parallel rays in each such plane from any point of said subject being in a direction different from the direction of parallel rays in said plane from any other point of said subject, and to converge to a focus at the emulsion plane of said film in a plane intersecting said film transversely, directing part of the parallel rays in said planes intersecting said film longitudinally to a focal point at the emulsion plane of said film, which focal point coincides with the point of focus of rays from the same point of said subject converging as aforesaid in a plane intersecting said film transversely, recording the focal points on said film, and scanning said parallel rays by moving said film longitudinally, the focal points of light from each point of said subject remaining stationary on the emulsion plane of said film throughout the longitudinal movement of said film.

THOMAS STEPHEN.
RICHARD K. PARSELL.